May 8, 1934.  J. P. BOURDIC  1,957,521
LASH ARRESTING AND VIBRATION DAMPENING MEANS
Filed Oct. 2, 1933
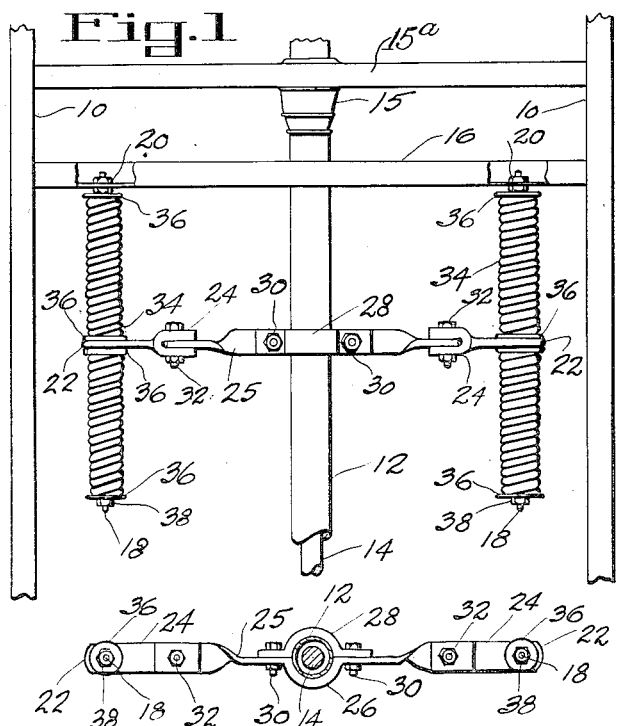
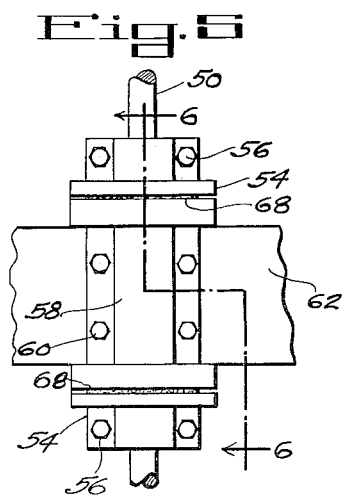
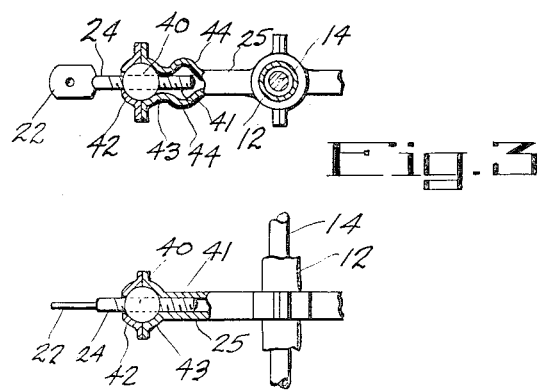
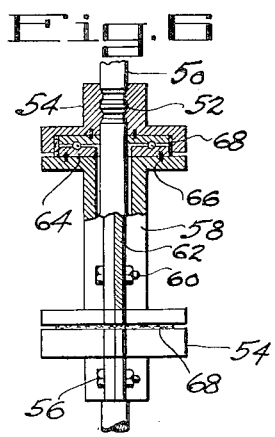
INVENTOR
Jack P. Bourdic
BY Daniel G. Cullen
ATTORNEY.

Patented May 8, 1934

1,957,521

UNITED STATES PATENT OFFICE 1,957,521

LASH ARRESTING AND VIBRATION DAMPENING MEANS

Jack P. Bourdic, East Detroit, Mich., assignor of one-half to Leopold E. Zink, Detroit, Mich.

Application October 2, 1933, Serial No. 691,788

3 Claims. (Cl. 180—70)

This invention relates to lash arresting and vibration dampening means.

The invention is disclosed in connection with parallel members of a vehicle frame, between and parallel to which is a shaft, the means arresting lash and dampening vibration in the shaft.

In one embodiment, the invention is disclosed in connection with a stationary hollow shaft or torque tube through which passes the rotating vehicle drive shaft; in another embodiment the invention is disclosed in connection with a rotating drive shaft; and it will be understood that the invention may be used in connection with a stationary shaft or a rotating shaft, as desired.

In the various modifications disclosed, the means includes a plurality of coil springs, but it is of course to be understood that it may include other devices, such as fluid or oil filled dash pots, rubber or cork blocks, etc., which may be utilized in the combination as considered desirable.

The principal object of the invention is to provide means for arresting lash and dampening vibration in shafts or the like.

Other objects of the invention will readily appear upon reference to the following detailed description of the embodiments thereof disclosed in the appended drawing. In this drawing, Fig. 1 shows, in top plan, vehicle frame members provided with a means of the invention, shown in connection with a stationary hollow shaft or torque tube through which passes a vehicle drive shaft, parts being cut away for purposes of clarity;

Fig. 2 is an end elevational view of Fig. 1, looking towards the front end of the vehicle;

Fig. 3 shows a ball and socket type of connection between parts of the lash arresting means;

Fig. 4 shows the same parts in plan view;

Fig. 5 shows, in top plan view, details of the device as designed for use in connection with a rotating shaft; and Fig. 6 is a section as if on line 6—6 of Fig. 5.

Referring to the drawing it will be observed that Figs. 1 and 2 show parallel vehicle frame members 10 between which is disposed a stationary hollow shaft or torque tube 12 through which is telescoped the rotating drive shaft 14 of the vehicle, there being at the forward ends of the shafts, a universal joint 15 fixed to the frame member 15a. The shaft 12 is the shaft to which the means of the invention is specifically secured and the means of the invention will now, therefore, be described.

Traversing the shaft 12 and securely connected to and connecting the frame members 10, is a cross member 16 which may be a part of the original frame equipment of the vehicle, or a separate member applied to the vehicle frame as additional equipment when the means of the invention is to be utilized. In any event, the member 16 is part of the fixed structure, whether it be original equipment or later added equipment.

Parallel to the frame members 10 and between the shaft 12 and these frame members are two rods 18, each of which, at one end thereof, is fixedly and securely bolted to the cross member 16 by the nuts shown at 20. These rods are passed through holes in the blade portions 22 of forked straps 24 which project from the rods towards the shaft 12 and to the free ends of the straps 24 are secured the ends of a cross piece 25 surrounding and clamped to the shaft 12, the clamp of the cross piece including a base portion 26 and a cap portion 28 bolted thereto by bolts 30. The connections between the cross piece ends and the forked ends of straps 24 include bolts 32, which permit relative pivotal movement in a vertical plane between the straps and the cross piece, and thus in turn permit relative movement in vertical paths between the frame members 10 and the shaft 12. These connections, however, restrain relative movement, in horizontal paths, between the frame members and the shaft 12.

Surrounding the rods 18 and between the ends thereof and the straps 24 are tightly coiled compression springs 34 at whose ends are washers 36. These coiled springs are held in place on the rods 18 by the blade portions 22 of the straps 24, and by the cross member 16, in one instance, and by the nuts 38 at the ends of the rods, in another instance. The coil springs 34 restrain the shaft 12 from relative longitudinal movement with respect to the frame members 10 and thus arrest lash and vibration in the shaft 12 without interfering with the relative vertical movement between the shaft 12 and the frame.

The resistances of the springs 34 and consequently their effect in eliminating lash and vibration in the shaft 12 can be regulated by the nuts 20—38 on the ends of the rods 18, to accommodate the device to various requirements.

In the foregoing, coil springs 34 have been shown as the lash arresting parts; however, it is to be understood that other means might well be employed. For example, oil filled dash pots having piston and cylinder parts, or rubber or cork blocks, might well be employed as the lash arresting parts and specific illustrations of such constructions are not here given inasmuch as the design of lash arresting means including such parts is well within the purview of the skilled mechanic having the instant specification before him.

Figs. 3 and 4 show details of construction of the straps 24 and the cross piece 25 which might well be employed. Each strap 24 in this case has a ball 40 secured thereon, and provided with an extension 41, received in a two part spherical socket 42 formed on the hollow end 43 of the cross piece 25, the hollow end being further provided with extrusions 44 on its opposite horizontal walls aligned with the extension 41. This construction permits relative pivotal movement between the straps 24 and the cross piece in vertical paths, and relative axial rotation between the straps and the cross piece, but restrains relative longitudinal movement between the clamp and the straps.

Further, Figs. 3 and 4 show the clamp part of the cross piece 25 as being divided on a vertical plane, rather than on a horizontal plane, as is the case with the clamp part of the cross piece of Figs. 1 and 2.

In Figs. 5 and 6, there is shown a detail of the cross piece construction employed in the event the shaft, whose lash and vibration are to be arrested, is a rotating shaft, as is the case with certain types of vehicles wherein the rotating drive shaft is exposed, rather than encased in a torque tube.

The rotating shaft, referenced 50, is provided with ribs and grooves 52 interlocking with similar formations on semi-annular abutment collars 54 which are bolted together by bolts 56 so as to be immovably secured to, and therefore rendered substantially integral with, the shaft 50. Between these abutment collars 54 are semi-annular collars 58, bolted together by bolts 60, these collars being parts of a cross piece 62 which corresponds to cross piece 25 of the previously described constructions.

The construction here shown therefore can be seen to be such that shaft 50 is not longitudinally movable with respect to the cross piece 62 but is freely rotatable therein, and these are the characteristics desired for a cross piece construction to be used with a rotating shaft.

In order to enhance the perfection of the construction here shown, frictionless thrust bearings, referenced generally 64, are disposed between the ends of the semi-annular collars 58 of the cross piece 62 and the semi-annular abutment collars 54, and the races of these bearings are immovably secured with respect to the collars, by dowel pins 66 disposed as shown. Packings 68 of felt or the like surround the bearings 64 in order to seal, within the collars 58, a lubricating medium for lubricating the thrust bearings, all in accordance with good practice.

Now having disclosed several embodiments of the invention, which disclosure is not intended as limiting the invention to the embodiments disclosed, but which is provided to illustrate the invention, reference is had to the appended claims which determine the scope of the invention.

I claim:

1. In a vehicle, a frame, a shaft for driving the vehicle wheels, a universal joint connecting said shaft to said frame, resilient lash arresting means for said shaft rigidly connected to said frame, a cross piece rigidly connected to said shaft at a point remote from the joint and also connected to and acted upon by the lash arresting means, said cross piece having a hinge disposed therein to permit said frame to rise and fall with respect to the shaft.

2. In a vehicle, a frame including side frame members, a shaft centrally therebetween and substantially parallel thereto for driving the vehicle wheels, a universal joint connecting said shaft to said frame, resilient lash arresting means for said shaft comprising rods rigidly connected to said frame and having coiled springs thereon, a cross piece rigidly connected to said shaft at a point remote from said joint and also connected to said rods and acted upon by said springs, said cross piece having hinges disposed therein to permit said rods to rise and fall with respect to said shaft.

3. In a vehicle, a frame including side frame members, a shaft centrally therebetween and substantially parallel thereto for driving the vehicle wheels, a universal joint connecting said shaft to said frame, resilient lash arresting means for said shaft comprising rods disposed between said shaft and said side frame members and rigidly connected to said frame and having coiled springs thereon, a cross piece rigidly connected to said shaft at a point remote from said joint and also connected to said rods and acted upon by said springs, said cross piece having hinges disposed therein to permit said rods to rise and fall with respect to said shaft.

JACK P. BOURDIC.